(12) United States Patent
Bell et al.

(10) Patent No.: US 7,103,667 B1
(45) Date of Patent: Sep. 5, 2006

(54) ANNOUNCED SESSION CONTROL (75) Inventors: Sarah Bell, Cottenham (GB); Sarom Ing, Ipswich (GB); Steven Rudkin, Ipswich (GB)

(73) Assignee: British Telecommunications, London (GB)

( * ) Notice: Subject to any disclaimer, the term of this patent is extended or adjusted under 35 U.S.C. 154(b) by 0 days.

(21) Appl. No.: 09/830,459

(22) PCT Filed: Nov. 19, 1999

(86) PCT No.: PCT/GB99/03870

§ 371 (c)(1),
(2), (4) Date: Apr. 27, 2001

(87) PCT Pub. No.: WO00/33534

PCT Pub. Date: Jun. 8, 2000

(30) Foreign Application Priority Data

Nov. 27, 1998 (GB) .................................. 9826157

(51) Int. Cl.
G06F 15/04 (2006.01)
G06F 15/163 (2006.01)
G06F 15/16 (2006.01)
G06F 15/173 (2006.01)

(52) U.S. Cl. ...................... 709/227; 709/227; 709/228; 709/229; 709/230; 709/231

(58) Field of Classification Search ................ 709/227, 709/228, 229, 230–237; 379/202.01, 205.01, 379/206.01; 370/259–261, 265, 391–392
See application file for complete search history.

(56) References Cited

U.S. PATENT DOCUMENTS

| 5,062,106 A | 10/1991 | Yamazaki et al. |
| 5,557,320 A | 9/1996 | Krebs |
| 5,757,669 A | 5/1998 | Christie et al. |
| 5,802,466 A | 9/1998 | Gallant et al. |
| 5,930,337 A | 7/1999 | Mohler |
| 6,006,253 A * | 12/1999 | Kumar et al. ............... 709/204 |
| 6,088,732 A | 7/2000 | Smith et al. |
| 6,105,069 A | 8/2000 | Franklin et al. |
| 6,108,706 A | 8/2000 | Birdwell et al. |
| 6,163,531 A * | 12/2000 | Kumar ....................... 370/260 |

(Continued)

FOREIGN PATENT DOCUMENTS

EP  0367700 A2  5/1990

(Continued)

OTHER PUBLICATIONS

Christian Blum et al, A Terminal-Based Approach to Multimedia Service Provision, 1994, IEEE.*

(Continued)

*Primary Examiner*—Hassan Kizou
*Assistant Examiner*—Habte Mered
(74) *Attorney, Agent, or Firm*—Nixon & Vanderhye P.C.

(57) ABSTRACT

A method and system manages media stream connections in a media session, for example a multimedia conference, that is to take place over multicast capable links provided in networks configured for Internet Protocol operation, (i.e., the communications network known as the MBone (Internet Protocol Multicast Backbone)). The method comprises receiving a session description of a media session by way of a session announcement over a network; parsing the session description to determine appropriate media application program(s) for processing at least one media stream of the session description, and connecting the one or more selected media streams to one or more respective media application programs utilising a session control configured for managing media stream connections for the one or more media application programs.

29 Claims, 7 Drawing Sheets

U.S. PATENT DOCUMENTS 6,259,701 B1 * 7/2001 Shur et al. .................. 370/401
6,396,513 B1 5/2002 Helfman et al.

FOREIGN PATENT DOCUMENTS

| EP | 0798905 A2 | 10/1997 |
| --- | --- | --- |
| EP | 0 887 995 A2 | 12/1998 |
| EP | WO 0031930 | 12/1998 |
| GB | 9826157.1 | 11/1998 |
| GB | 9826158.9 | 11/1998 |
| GB | 9913921.4 | 6/1999 |
| WO | WO 97/22201 | 6/1997 |
| WO | WO 00/33535 | 8/2000 |

OTHER PUBLICATIONS

Avaro et al, "The MPEG-4 Systems and Description Languages: A Way Ahead in Audio Visual Information Representation", Signal Processing, Image Communication, NL, Elsevier Science Publishers, Amsterdam, vol. 9, No. 4, May 1, 1997, pp. 385-431, XP004075337.

Thimm et al: A Mail-Based Teleservice Architecture for Archiving and Retrieving Dynamically Composable Multimedia Documents, Multimedia Transport and Teleservices, International Cost 237 Works Proceedings, Vienna, Nov. 13-15, 1994, pp. 14-34, XP000585292.

Avaro et al., "The AVIS Project: A Mixed Communication/Interactive/Broadcast Teleconferencing System", Protocols for Multimedia Systems—Multimedia N 1997, Proceedings, IEEE Conference, Nov., 1997, pp. 37-43.

Liechti et al, "Structured Graph Forma:XML Metadata for Describing Web Site Structure", NL, North-Holland Publishing, Amsterdam, vol. 30, No. 1-7, Apr. 1, 1998, pp. 11-21, XP004121444.

Handley et al., "SDP: Session Description Protocol", RFC2327, Apr. 1998, pp. 1-42, XP002101463, http://WWW.cis.ohio-state.edu/htbin/rfc/rfc2327.html.

International Search Report—PCT/GB99/03831, International Search Report—PCT/GB99/03871.

Laier et al., "Content-Based Multimedia Data Access in Internet Communication", found in a paper entitled: Wireless Image/Video Communications, 1996., F. International Workshop, Sep. 1996, pp. 125-133.

Thomas Sikora, "The MPEG-4 Video Standard Verification Model", Feb. 1997, Circuits and Systems for Video Technology, IEEE, pp. 19-31, vol. 7, Issue 1.

International Preliminary Examining Authority.

EPO Office Action dated Jan. 11, 2005.

Choi et al., "Issues in Enterprise E-Mail Management", IEEE Communications Magazine, vol. 34, No. 4, Apr. 1, 1996, pp. 78-82, XP000586075.

Rudkin et al, "A Scheme For Component Based Service Deployment", Trends In Distributed Systems: Towards A Universal Service Market, Third International IFIP/GI Working Conference, USA 2000, Proceedings (Lecture Notes In Computer Science vol. 1890), Trends In Distributed Systems: Towards a Universal Service Market, pp. 68-80, XP001020425, 2000.

Matsubara et al, "Worldwide Component Scripting with the Planet Mobile Object System", Worldwide Computing and its Applications-WWCA '98. Second International Conference Proceedings, Worldwide Computing and its Applications-WWCA '98. Second International Conference Proceedings, Tsukuba, Japan, Mar. 4-5, 1998, pp. 56-71, XP001023132. 1998.

* cited by examiner

ANNOUNCED SESSION CONTROL

BACKGROUND

1. Technical Field

The present invention relates to the announcement of media stream connections for a media session over a communications network.

2. Description of Related Art

Multicast transmissions are becoming increasingly common on the Internet. In contrast to standard Internet Protocol (IP) point to point transmissions (unicast), IP multicast allows the simultaneous transmission of information to a group of recipients from a single source. Routing support for IP multicast transmissions is provided by the MBone (IP Multicast Backbone) which is a virtual network layered on top of the Internet.

IP multicast allows real-time communications over wide area IP networks and typical transmissions include video and audio conferencing, live multimedia training, university lectures and transmission of live television programmes.

A multicast transmission usually consists of a multimedia session made up of several individual media streams typically carrying video, audio, whiteboard or raw data. Some sessions are persistent, but the majority exist for a specific period of time, although need not be continuous. Multicast based transmissions on the MBone differ from unicast IP transmissions in that any user receiving the transmission can join the session (unless the transmission is encrypted) and to receive a transmission, a user need only know the appropriate transmission address and timing information.

Prior to a multicast transmission an appropriate announcement containing a session description is made, usually at an IP group multi-cast address. Standard session descriptions are generated using a Session Description Protocol (SDP), as defined in the Internet Engineering Task Force's draft RFC 2327. SDP is a simple ASCII text based protocol that is used to describe real time multimedia sessions and their related scheduling information. SDP messages are wrapped in a carrier protocol, known as a Session Announcement Protocol (SAP), which, in addition to containing the necessary IP addressing and routing information for transmission across the Internet or MBone, allows the SDP message to be encrypted, signed or compressed. An announcement can then be sent at regular intervals to the announcement group address. As an alternative to SAP, a session may be announced by placing an SDP message on a World Wide Web site (WWW) or by sending it to individuals by email or as a unicast transmission inviting them to participate.

An SDP message conveys information about each media stream in the multicast multimedia session to allow the recipients to participate in the session. A typical SDP message will include the session name and purpose, the time(s) and date(s) the session will be active, the component media streams of the session and information required to participate in each media stream (IP multicast address, port, media format). The SDP message may also include details of the session's bandwidth requirements, an encryption key necessary to participate in a secure multicast transmission using public key encryption, contact information for the organiser of the multicast session, and a Unique Resource Indicator (URI) pointing to a WWW or an Intranet web site where further information on the session may be found, for example, background information relating to the conference.

The level of participation a user may make in a session or stream depends on its purpose. In a multicast television session, typically users would only be able to receive the session streams whilst in a multicast conference session the communication would be bidirectional with a central server (such as group address 120) receiving each participants transmissions and relaying them to the other participants. The level of participation expected of a user in a session or stream may be explicitly stated in the session description or it may be inherent from the session description, for example when a receive-only application is associated with a media stream type in the session description.

A common front end interface used by multicast end users is known as Session Directory Rendezvous (SDR). This interface takes the received announcements, decodes the SDP message and displays the names of those sessions that are still current in a list. The end user may then select one of the listed announcements to view further technical and user-oriented details of the announced session. From the displayed information, the end user can then select to join individual streams of the session or to join the entire session. Once the streams to be joined are selected, SDR starts the necessary multicast-enabled multimedia application on the end user's computer, such as Vic and Vat, and passes the relevant stream information (a transport port address) from the announcement onto the application allowing the application to establish the link to the associated IP multicast address and participate in the stream at transmission time. Having initiated the applications and passed the relevant transport port address SDR plays no further part in the session.

Recent increased usage and demand for (multi)media sessions has highlighted a number of limitations in SDP. SDP limits session descriptions to defining a session having a single set of timings that apply to all of the streams within it. A session in which a stream starts mid-way through the transmission cannot easily be described using SDP. The structure of a session description written in SDP must be a simple linear list of streams which may not reflect the intuitive structure of a complex session. SDP supports a limited and predefined set of applications which can receive the streams and a limited and predefined set of transport mechanisms (e.g. Simple layering, RTP and UDP). As guaranteed Quality of Service (QoS) is becoming more and more desirable to the consumer and the supplier, the need to define QoS policies for the entire session and individual streams in terms of required system resources, bandwidth requirements and supported applications also needs to be met. There may also be requirements on the prioritisation of streams and subsessions or more complicated rules about receiving streams. A further requirement on the part of the supplier will be the need for charging facilities permitting the charging of an end user for a multicast transmission to which they subscribe according to the QoS and types of streams received etc. There is little scope to include information about QoS policies or charging within the conventional structure of an SDP session description, or any metadata about the session.

A problem faced by providers of current (multi)media sessions and the developers of the associated (multimedia applications is the spread of skills required to implement an application that can initiate and manage a real-time data connection over a communications network and perform the (multi)media functions the end user would expect. For example, developers of multimedia applications require teams with skills in audio and video coding, network transport protocols, real time programming, user interface design and integration techniques. Furthermore, until now the only way a QoS policy could be implemented was to process a session description to determine which streams of a session could or should be run and then to initialise the applications so they connect to the respective streams. This required the communications manager not only to know about the session requirements and available system resources but also the capabilities of each application.

BRIEF SUMMARY OF EXEMPLARY EMBODIMENTS

According to the first aspect of the invention there is provided a method of managing media stream connections for a media session, said method comprising the steps:
receiving a session description of a media session;
parsing the session description to determine appropriate media application programs for processing a or each media stream of the session description;
selecting one or more media streams identified in the session description, the session description including data relating to a quality of service policy; and
determining based on available resources whether participation in the media session is viable using the quality of service policy based on said data;
connecting the selected one or more media streams to one or more respective media application programs utilising a session control configured for managing media stream connections for the one or more media application programs.

Preferably, the selection of the one or more media streams is carried out by the session control according to predetermined criteria.

In particular exemplary embodiments, the predetermined criteria are specific to the preferences of at least one of the group consisting of an end-user, the terminal and the one or more media application programs.

Conveniently, the media applications select one or more of the media streams identified in the session description which are required and pass respective connection requests to the session control.

The method may further comprises the step of passing at least a portion of the session description to the one or more media applications.

In particular exemplary embodiments the media applications generate or modify a quality of service policy for the connection requests for use by the session control.

Conveniently, the media applications modify the session description for changing the subsequent management of connections by the session control system.

The session control may passes the connection requests to a terminal communications manager which determines whether the connection requests are viable and subsequently initiates the connections.

In particular exemplary embodiments, the session control prioritises the connection requests from the media applications according to the quality of service policy to create a set of connection requests which are passed to the communications manager.

Conveniently, the communications manager determines resources required for each connection request and whether the requests can be met given available resources.

If the connection requests can be met the connections are initiated. If a connection request cannot be met and the connection request is for an optional media stream of the media session then the communications manager proceeds by declaring the connection request unviable and moves to the next connection request. if a connection request cannot be met and the connection request is for a mandatory media stream of the media session then the communications manager proceeds by attempting to free resources to meet the connection request, and if the communications manager is unable to free sufficient resources to meet the connection request, the connection request is declared unviable and the communications manager refuses to join the media session.

In particular exemplary embodiments the method further comprises the step of obtaining a missing part of the session description by following a link or links in the session description before parsing the session description.

According to a second aspect of the invention there is provided a system for managing media stream connections derived from a session description for a media session, the system comprising a session control for parsing the session description to determine appropriate media application programs for processing at least one media stream of the session description; a communications manager for determining based on available resources whether participation in the media session is viable using a quality of service policy based on quality of service data provided in said session description; and the session control being configured to manage media stream connections for the media applications programs.

In an exemplary embodiment of the present invention media modules of a modular session description are checked by the respective multimedia client application prior to QoS management, thereby reducing the workload of the communications manager. That is, the respective client applications determine whether the media modules can be supported. The applications may also add to or modify the session description to include their own QoS policies or to change the way in which the session and/or its initiation will be managed. Furthermore, applications need only request streams from the session control system associated with the client since the session control now handles centrally the creation and management of streams in real time. In this way the exemplary embodiment simplifies application development and service provision.

A further problem is that applications should be able to adapt to available network and host resources. This is particularly important for multi-party applications operating in heterogeneous environments where each party may have different resources available to them. Furthermore the nature of the heterogeneity may vary over the lifetime of the session, for example as network congestion varies or as the terminal resources are shared with other applications or other users. An exemplary embodiment of the present invention is able to use a QoS policy incorporated within the session description to prioritise the allocation of resources and to determine whether participation in the session is viable.

A further problem is that the application developer and service provider typically need to address security and charging requirements. An exemplary embodiment of the present invention allows security and charging policies to be incorporated within the session description for use within the session control system to invoke appropriate charging and security procedures. Instead of having to develop security and charging functions the application developer and service provider need only specify appropriate policies.

In an exemplary embodiment of the present invention, application development is simplified by using the session description to drive the dynamic management of communication channels and to adapt to available resources. It also reduces the problem of handling charging and security requirements to a matter of specifying charging and security policies within the session description.

An exemplary embodiment of the present invention is particularly useful when used in conjunction with the modular session description described in this patent application and which is also the subject of our co-pending UK patent application 9826158.9.

BRIEF DESCRIPTION OF THE DRAWINGS

An example of the present invention will now be described in detail with reference to the accompanying drawings, in which.

DETAILED DESCRIPTION OF EXEMPLARY EMBODIMENTS

Figure 1:
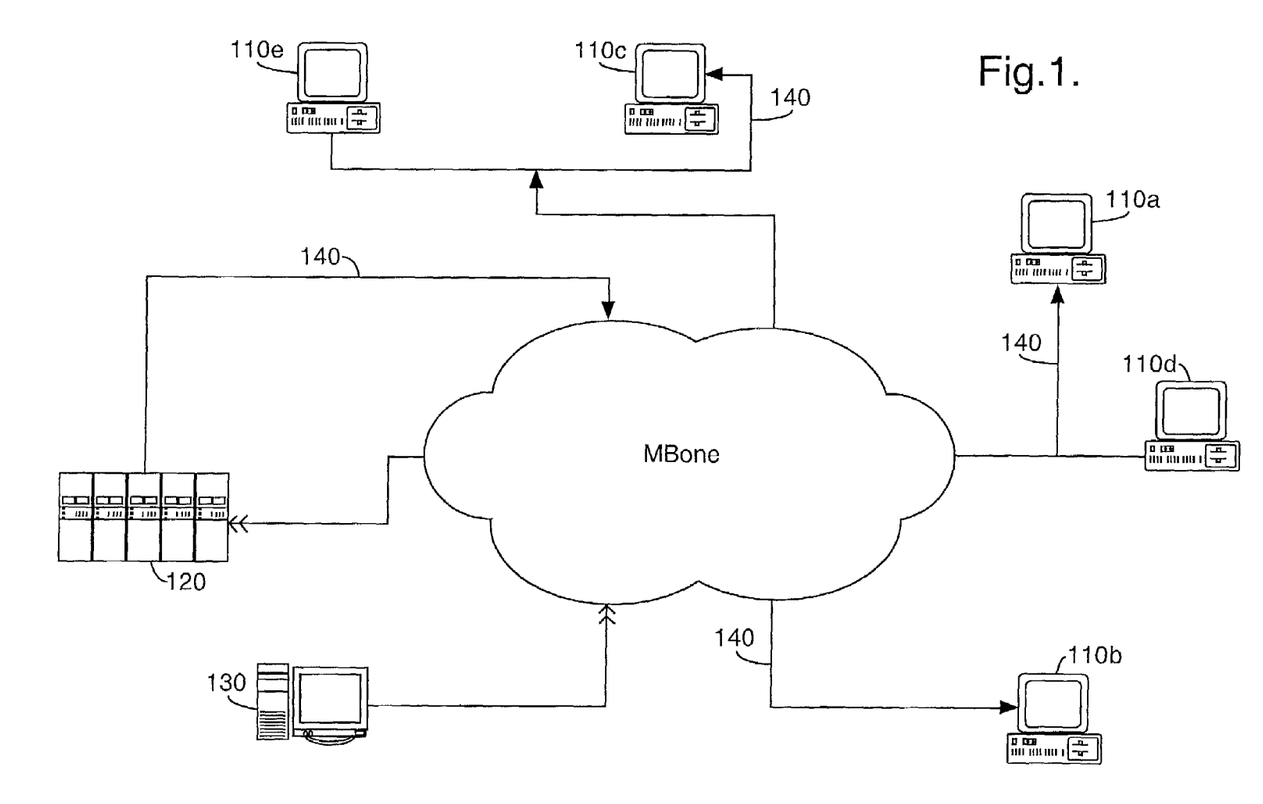
FIG. 1 is a schematic diagram illustrating a multicast transmission across the MBone.

An example of an IP multicast transmission system is described with reference to FIG. 1. Prior to a multicast transmission, an appropriate announcement containing a session description is made, thereby allowing end users 110*a*–110*e* to elect to receive the transmission. Each end user electing to receive the transmission is linked to a group IP Multicast address 120 associated with the transmission. At the transmission time of the multicast session, the session streams are transmitted from a source 130, or a plurality of sources, to the group address. At the group address, the transmission is disseminated along the links 140 to those end users who have elected to receive it (in this example end users 110*a*–110*c*).

Figure 2:
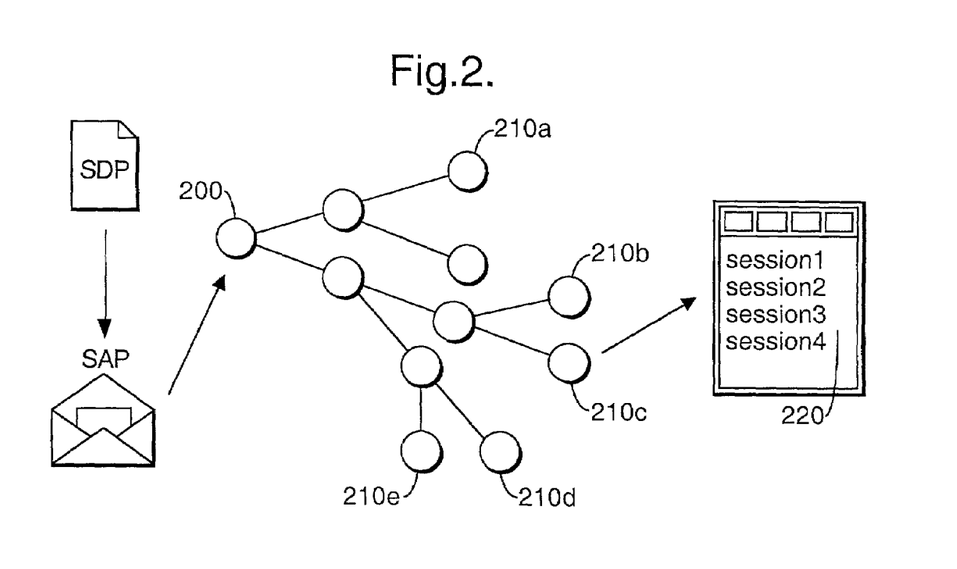
FIG. 2 is a schematic diagram illustrating the distribution of an SDP announcement.

An example of an announcement and election system is described with reference to FIG. 2. Most public multicast sessions are announced at a single group IP multicast address 200 dedicated to the transmission of announcements to multicast end users. End users 210*a*–210*e* electing to receive the announcements are linked to the announcement group address and, in the same way as an actual session transmission, each announcement arriving at the announcement group address is disseminated to the end users. A front end interface 220 on each end user's computer displays information obtained from the associated session description for each announcement. The minimum information a session description may contain is a time and date that the session will be active and the group IP multicast address(es) from which the end user may elect to receive one or more media streams and to which they could send their own streams for the session. Using the front end interface, an end user can select the announced session(s), or their component stream(s) they wish to participate in.

Figure 3:
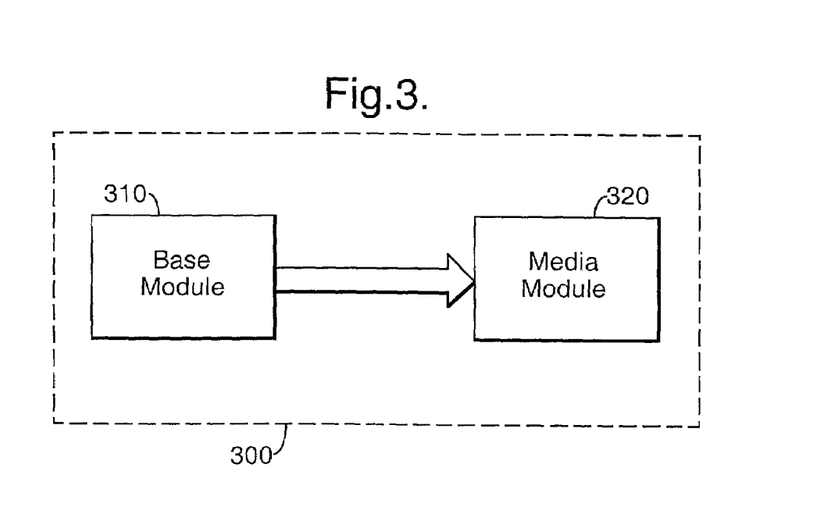
FIG. 3 is a block diagram of a modular session description of a simple session generated in accordance with the present invention.

FIG. 3 is a block diagram of a session description 300 for a simple multicast television session. The session description 300 comprises a base module 310 linked to a media module 320.

The base module 310 contains user oriented data relating to the session including the title and timing information. The base module 310 may also include a description or abstract, contact information about the organiser and a WWW or an intranet URI pointing to a web site containing further information. Ideally, the base module 310 should contain enough information for the user to decide if they are interested in participating in the session.

The media module 320 contains announcement data relating to a video stream of the session. The media module 320 contains the technical information (data) necessary for the user to receive the associated media stream. In particular, connection, timing and media format details are provided.

A first example of a session description 300 generated for transmission to end users is shown below:

```
type=(base)
id=(310)
info=(title="live multicast television session")
source=(name="A.Sender" email=asender@tx.com)
media=(video=(client=odbits0.16))
time=(length=50m repeat=continuous)
category=("Entertainment")
options=(none)
modules=(m=320)
)
(
type=(media)
id=(320 310)
media=(video=(client=odbits0.16))
connection=(229.1.1.2/7000)
time=(length=50m)
)
```
Session description example 1

The base module 310 has a unique identifier (id field) used in the generation of links between two modules during the processing of the session description. The modules field of the base module 310 lists the type and unique identifier of the media module 320 linked to the base module 310. The second identifier in the id field of the media module 320 is the unique identifier belonging to the base module 310 linking the media module back to the base module 310. By extension, these two-way links permit a module tree to be traversed from a base module downwards or from a media module upwards. The use of this feature is described later with reference to session description example 4.

The connection field of the media module 320 contains the IP multicast address and port number from which the media stream can be received.

Figure 4:
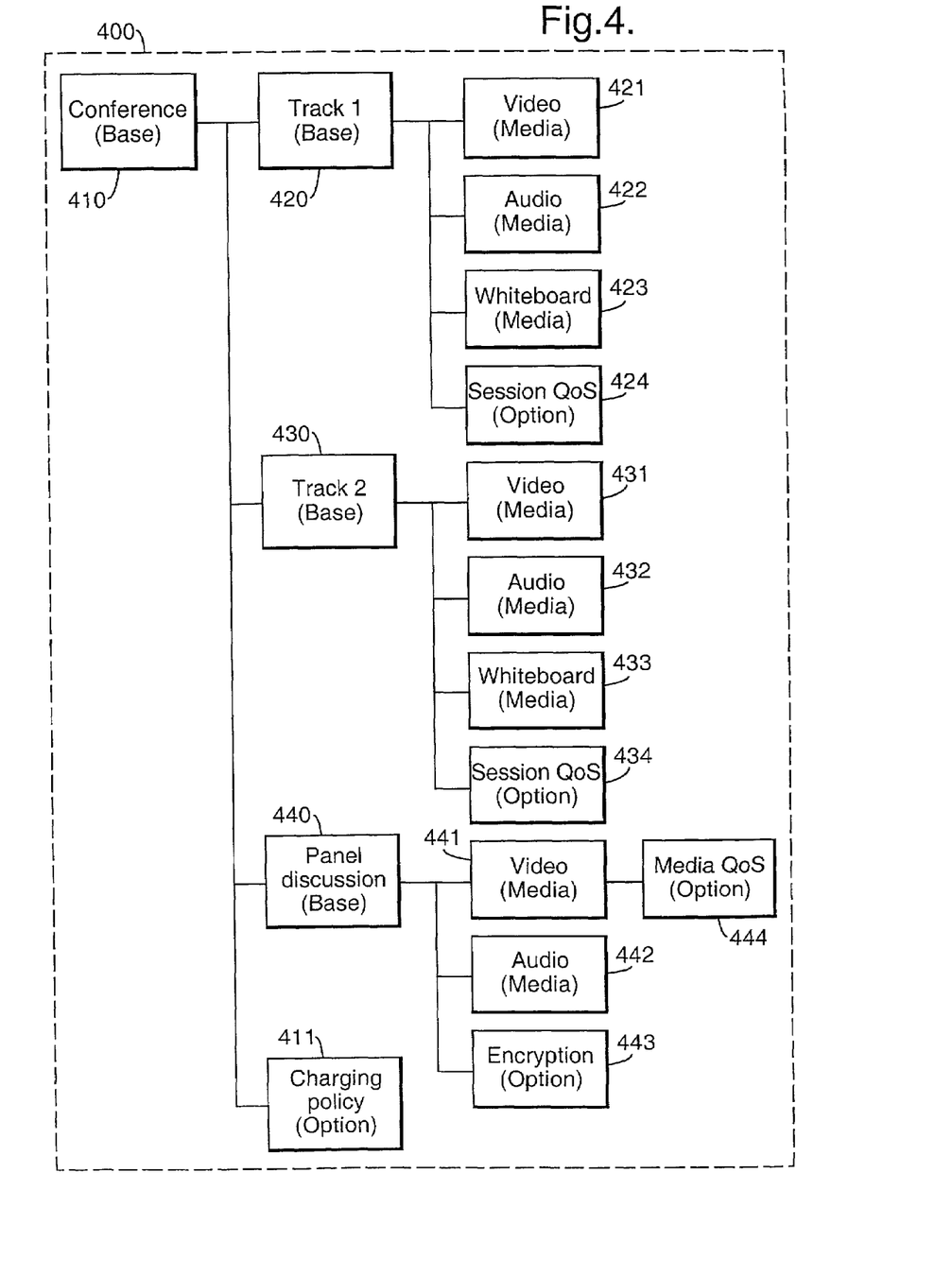
FIG. 4 is a block diagram of a modular session description of a complex session generated in accordance with the present invention.

FIG. 4 is a block diagram of a session description 400 for a complex multicast session of a multimedia conference with two tracks, or sub-sessions, and a panel discussion. Each track provides multiparty video and audio conferencing and a shared whiteboard for leaving notes and messages. The panel discussion is encrypted and the whole conference is subject to a subscription fee payable in advance by each participant.

The session description 400 contains a top level base module 410 linked to further base modules 420, 430, 440 and an options module 411. The top level base module 410 contains data relating to the overall session including its name, purpose and timing information. The options module 411 contains details of the payment mechanism for subscription fees.

Each further base module 420, 430, 440 relates to a subsession of the conference. Base module 420 relates to the first track of the conference. The base module 420 is linked to media modules 421–423, each containing connection, timing and media format data for respective video, audio and whiteboard streams.

The base module 420 is also linked to options module 424 which contains data relating to a QoS policy for the first track defining which media modules are optional and which are mandatory for a participant of the first track. The mandatory list contains identifiers of those media modules which are needed for the session or subsession to operate correctly whilst the optional list contains identifiers of the media modules that are not necessary for the session or subsession to operate correctly if system resources are scarce.

The base module 430 relates to the second track of the conference. It is linked to media modules 431–433, each containing connection, timing and media format details for respective video, audio and whiteboard streams. The base module 430 is also linked to options module 434 which contains data relating to a QoS policy for the second track defining which media modules are optional and which are mandatory for a participant of the second track. Base module 440 relates to the panel discussion. It is linked to media modules 441 and 442, each containing connection, timing and media format details for respective video and audio streams of the panel discussion. The base module 440 is also linked to options module 443 which contains encryption details (ie. how and where to get the necessary cryptographic keys) necessary for a participant to decode the panel discussion media streams 441, 442 according to a known encryption mechanism such as DES or public key encryption.

The video media stream defined in media module 441 is layered. Layering of media streams allows users with different system resources to receive as much of the stream as their system resources allows. Every user must receive the bottom layer of the stream containing the minimum stream data. However, if a user has sufficient free system resources they can receive the next layer up containing enhancements to the previous layer. Successive layers can be received enhancing the received media stream until the maximum number of layers is received or all free system resources capacity is used. The media module 441 is linked to an options module 444 which contains data on the layering necessary for the end user to be able to receive the layered stream correctly.

The portion of the session description 400 generated for modules 410, 411, 420 and 440 for transmission to end users is shown below in session description example 2.

```
(    # overall conference session
     type=(base)
     id=(410)
     info=(title="Multimedia98 Conference")
     source=(owner="Joe Bloggs" email=joe@nowhere.com)
     media=(video=(client=RealPlayerG2) whiteboard=(client=wb))
     time(start="09:00 GMT 25/12/98" stop="13:00 GMT 25/12/98")
     options=(oc=411)
     modules=(b=420 b=430 b=440 oc=411)
)
(    # conference track 1
     type=(base)
     id=(420 410)
     info=(title="MM98 Systems and Applications Track")
     source=(owner="Joe Bloggs" email=joe@nowhere.com)
     media=(video=(client=RealPlayerG2) whiteboard=(client=wb))
     time(start="09:00 GMT 25/12/98" stop="11:00 GMT 25/12/98")
     options=(osq=424)
     modules=(m=421 m=422 m=423 osq=424)
```

-continued

```
)
(    # session QoS for track 1
     type=(option-sQoS)
     id=(424 420)
     mandatory=(421 422)
     optional=(423)
)
(    # conference panel discussion
     type=(base)
     id=(440 410)
     info=(title="MM98 Panel Discussion")
     source=(name="Joe Bloggs" email=joe@nowhere.com)
     media=(video=(client=RealPlayerG2) whiteboard=(client=wb))
     time(start="11:00 GMT 25/12/98" stop="13:00 GMT 25/12/98")
     options=(osec=443)
     modules=(m=441 m=442 osec=443)
)
(    # video for panel discussion
     type=(media)
     id=(441 440)
     info=(title="MM98 Panel Discussion Video")
     source=(owner="Joe Bloggs" email=joe@nowhere.com)
     media=(video=(type=live client=RealPlayerG2))
     connection=(226.0.0.106/1010 policy=444)
     time=(start="11:00 GMT 25/12/98" stop="13:00 GMT 25/12/98")
)
(    # media QoS policy for panel discussion video
     type=(option-mQoS)
     id=(444 440)
     mechanism=(layer=(base=226.0.0.106/1010 number=3))
)
(    # encryption policy for panel discussion
     type=(option-sec)
     id=(443 440)
     participant=(member=w3c)
     publickey=(location=http://www.w3.org/members_only/)
     info=(location=http://www.w3.org/)
)
(    # charging policy for entire conference
     type=(option-chg)
     id=(411 410)
     mechanism=(type=AAA)
     price=(fee=1000GBP)
     info=(location=http://www.aaa.net/)
)
```

SESSION DESCRIPTION EXAMPLE 2

Where there is surplus network bandwidth available, complete session descriptions can be announced to end users who may then elect to receive the announced session or parts thereof. However, the individual modules of the session description do not need to be announced together. If the network bandwidth available for announcements restricts the size of session descriptions, only the top level base module may be announced. In this situation, the link between modules may be, for example, a URI to a WWW or an intranet web site or server, an email address, an IP multicast address, an FTP address or details of a file or database stored on a local computer system from which an interested user can obtain the remaining modules.

The following session description example illustrates how the above session description for base module 420 would be changed if media module 421 was stored on a WWW server:

```
(    # conference track 1
     type=(base)
     id=(420 410)
     info=(title="MM98 Systems and Applications Track")
     source=(owner="Joe Bloggs" email=joe@nowhere.com)
```

-continued

```
media=(video=(client=RealPlayerG2) whiteboard=(client=wb))
time(start="09:00 GMT 25/12/98" stop="11:00 GMT 25/12/98")
options=(osq=424)
modules=(m=421 location=http://www.announce.org/cgi-bin/
module.cgi?id=421
        m=421 m=423 osq=424)
)
```

Session description example 3

Furthermore, top level modules of a session description may be announced well in advance of the actual transmission, at a time where the final details of content are unknown, in which case the remaining levels may be made available from pre-announced links at a later time.

Figure 5:
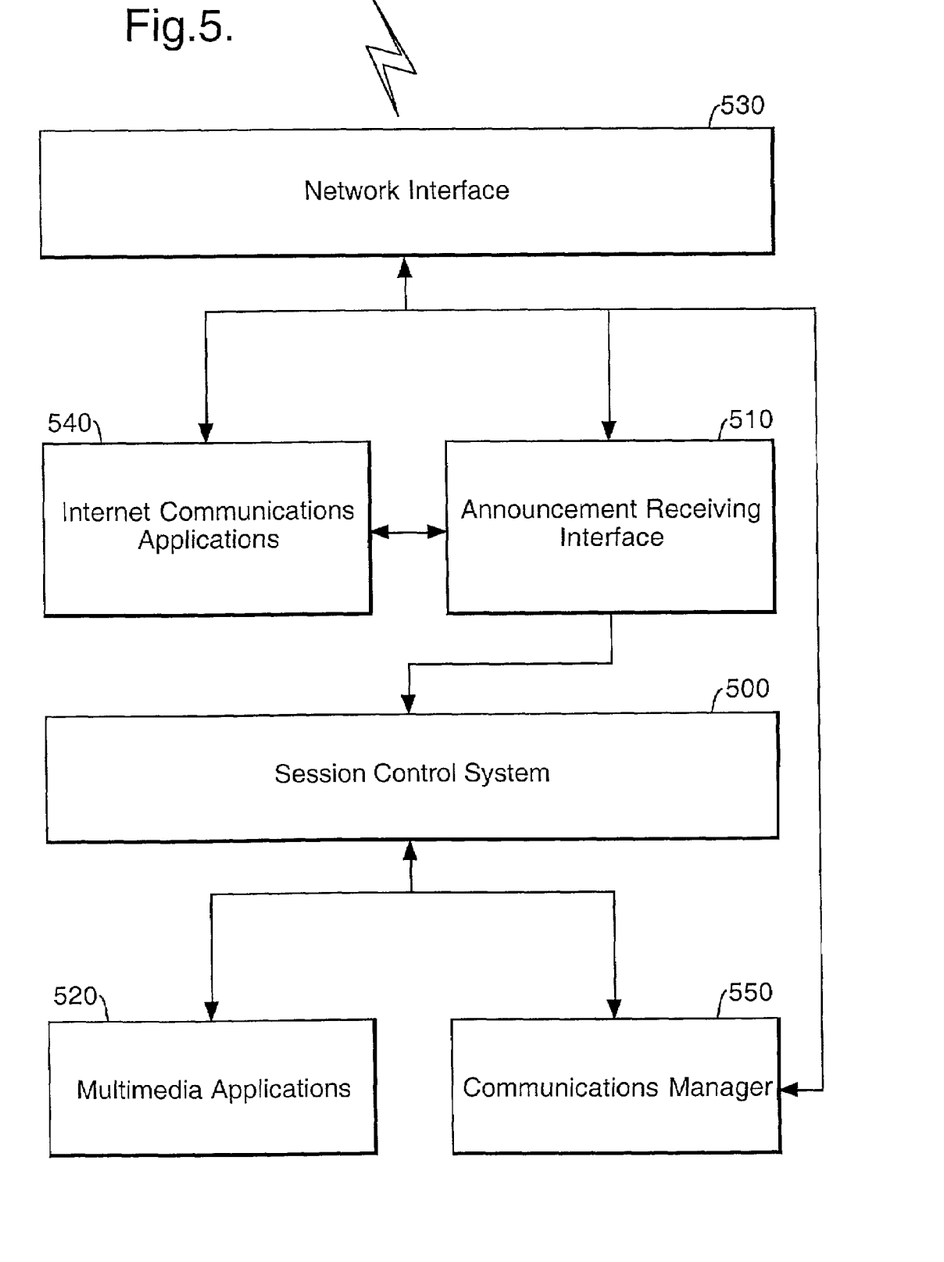
FIG. 5 is a schematic diagram of a system for managing media stream connections.

FIG. 5 is a schematic diagram of a system for managing media stream connections at a terminal of an end user system according to the present invention.

The session control system 500 is linked to an announcement receiving interface 510 and one or more multicast-capable multimedia applications 520. The session control system 500 and the announcement receiving interface 510 are connected to a network interface 530 via which announcements may be received and multicast transmissions may be initiated and/or received.

Announcements received at the network interface 530 are routed to the receiving interface 510. The receiving interface 510 decodes each announcement to obtain the session description and displays the user oriented information from the one or more base modules in a list to the user. The user is able to select a session description from the list announcing a session they wish to receive. The selected description is passed to the session control system 500 which determines which of the user's multimedia applications 520 are required for participation in the described session, starts the applications and initiates and provides the necessary media streams to the respective applications 520 via a communications manager 550.

The receiving interface 510 may be linked to other Internet communications applications 540 such as a WWW browser or an email client (not shown) which may be used to gather further information on the described session based on links provided in the session description. Also, where an incomplete set of base and/or media modules of a session description are received, the receiving interface 510 attempts to obtain the remaining modules using the Internet communications applications prior to passing it onto the session control system 500.

Figure 6:
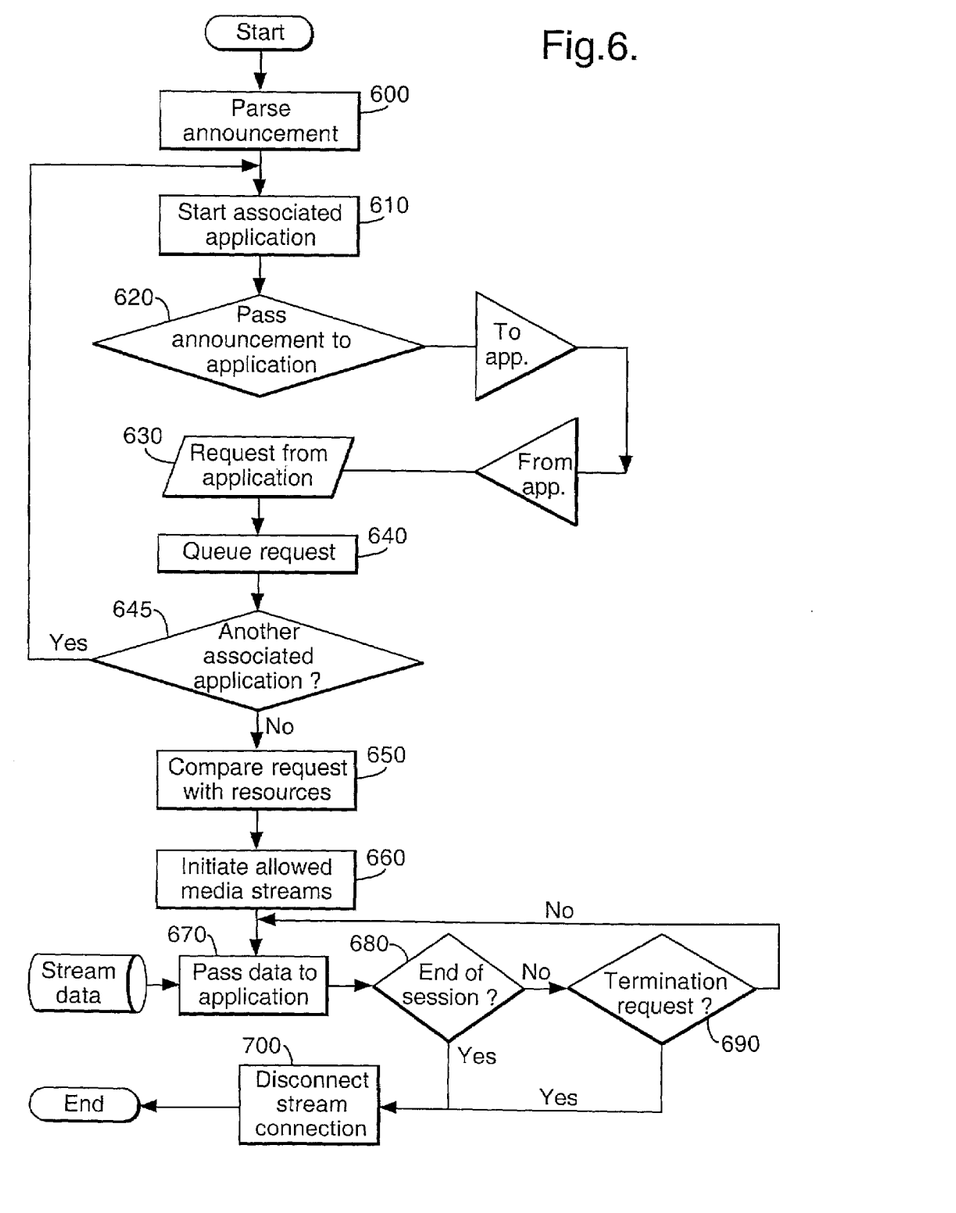
FIG. 6 is a flow chart illustrating the steps involved in managing a media session according to the system of FIG. 5; and, FIG. 7 is a flow chart further illustrating a parsing step of FIG. 6.

FIG. 6 is a flow chart showing the steps taken by the session control system 500 upon receipt of a session description. The description is first parsed in step 600 to identify client applications for each media module. Once this is done a second parse is carried out where applications are launched in step 610, that is to say for each media module start the application specified in the client field if that application has not already been started. The portion of the session description relating to the respective media type, i.e. the media module, the base module directly above the media module, all other modules attached to that base module and any other options modules that apply, is passed to the corresponding application in step 620. Since the media modules are marked with appropriate client applications, each application will be able to select those media streams that it wants to participate in. The application replies to the session control system with a connection request specifying its requirements in the form of a list of identifiers of media modules from which streams are to be initiated in step 630. The connection request is assembled by the session control system in step 640 and the system then parses the session description to identify other applications to launch in step 645. If a further media type is found, steps 610 to 640 are repeated, otherwise the session control system uses the assembled connection requests to form a list of media modules. This list is passed, together with a session QoS policy, to the communications manager, a system used in by the session control system, which determines according to the QoS policies and available system resources whether each connection request is viable.

The session QoS policy is constructed in two steps:—first, the multiple session QoS policies relevant for all the media modules to be initiated are combined into one session QoS policy: second, the resulting session QoS policy may be adapted to take account of (a) user default preferences (defined in a user profile), (b) a user's wish to determine the policy interactively, and (c) an application's default configuration (defined in the application profile(s)).

The communications manager responds to the session control system in step 650 with an indication of the viable media stream connection requests. If necessary, the session control system may contact a charging system to initiate accounting for the session prior to requesting the communications manager to create the viable media stream connections in step 660.

Once a session starts, each received data stream relating to the session is passed to the associated multimedia application in step 670 until the scheduled stream time ends in step 680 or the multimedia application requests to the session control system that the connection is terminated in step 690, at which point the session control system disconnects the connection in step 700.

Figure 7:
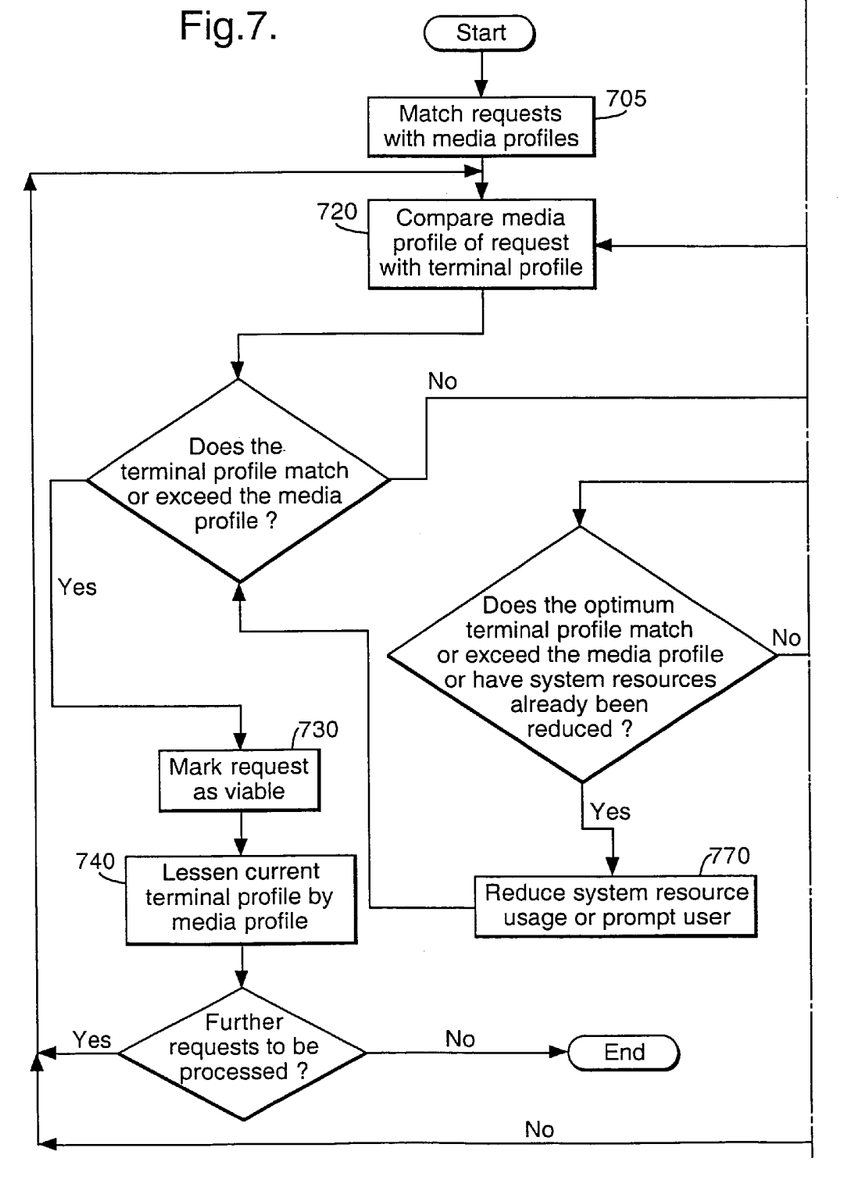

FIG. 7 is a flow chart showing the QoS management step 650 of FIG. 6 in greater detail.

Having received the assembled list of connection requests, the communications manager matches each item of this list to a media profile in step 705. A media profile defines requirements which must be met for the requested media stream to operate on the end user's computer including the minimum network bandwidth needed for satisfactory reception of the stream.

A terminal profile is determined in step 710. The terminal profile defines the resources which are available at the end user's computer for use by the requested media streams. This includes available network bandwidth, free memory and disk space and available hardware such as monitor size, processor speed and free audio and video capture devices. The media profile of each connection request is compared against the available system resources defined by the terminal profile in step 720. If the terminal profile matches or exceeds the media profile, the connection request is declared viable in step 730 and the availability of the resources of the terminal profile is lessened accordingly for the remaining connection requests in step 740. Each connection request is processed until there are no remaining requests or until the media profile of a request exceeds the terminal profile. In this situation, the communications manager determines the optimum terminal profile the user's computer would have if all non-essential applications were not running in step 750 and whether the computer is capable of fulfilling the media profile in step 760. If the computer is capable of fulfilling the media profile, the communications manager attempts to free system resources from currently allocated streams or connection requests which have lower priority or by asking the user to terminate other non-essential applications running on the computer in step 770. Alternatively, this could be done by reducing the number of layers received from a layered stream transmission. If sufficient resources cannot be found an exception is reported to the user and the connection request is marked as viable. If the media stream that cannot be received is defined as mandatory in a QoS policy for a media session or subsession, all the connection requests for that media session or subsession are cancelled in step 790. If, however, the media stream is optional, the communications manager continues processing further connection requests in step 720. Once all pending connection requests have been processed, the communications manager reports those that are viable to the session control system.

The processing of a session description will now be described with reference to FIG. 4 and session description example 4 which is the session description generated for Track 1 (modules 410 and 420–424 of FIG. 4).

```
(    # overall conference session
     type=(base)
     id=(410)
     info=(title="Multimedia98 Conference")
     source=(owner="Joe Bloggs" email=joe@nowhere.com)
     media=(video=(client=RealPlayerG2) whiteboard=(client=wb))
     time(start="09:00 GMT 25/12/98" stop="13:00 GMT 25/12/98")
     options=(oc=0010)
     modules=(b=420 b=430 b=440 oc=411)
)
(    # conference track 1
     type=(base)
     id=(420 410)
     info=(title="MM98 Systems and Applications Track")
     source=(owner="Joe Bloggs" email=joe@nowhere.com)
     media=(video=(client=RealPlayerG2) whiteboard=(client=wb))
     time(start="09:00 GMT 25/12/98" stop="11:00 GMT 25/12/98")
     options=(osq=424)
     modules=(m=421 m=422 m=423 osq=424)
)
(    # video for track 1
     type=(media)
     id=(421 420)
     info=(title="MM98 Systems and Applications Track Video")
     source=(owner="Joe Bloggs" email=joe@nowhere.com)
     media=(video=(type=live client=RealPlayerG2))
     connection=(226.0.0.100/1000)
     time=(start="09:00 GMT 25/12/98" stop="11:00 GMT 25/12/98")
)
(    # audio for track 1
     type=(media)
     id=(422 420)
     info=(title="MM98 Systems and Applications Track Audio")
     source=(owner="Joe Bloggs" email=joe@nowhere.com)
     media=(audio=(type=live format=g711))
     connection=(226.0.0.101/1001)
     time=(start="09:00 GMT 25/12/98" stop="11:00 GMT 25/12/98")
)
(    # whiteboard for track 1
     type=(media)
     id=(423 420)
     info=(title="MM98 Systems and Applications Track Whiteboard")
     source=(owner="Joe Bloggs" email=joe@nowhere.com)
     media=(whiteboard=(client=wb))
     connection=(226.0.0.102/1002)
     time=(start="09:00 GMT 25/12/98" stop="11:00 GMT 25/12/98")
)
(    # session QoS for track 1
     type=(option-sQoS)
     id=(424 420)
     mandatory=(421 422)
     optional=(423)
)
```

SESSION DESCRIPTION EXAMPLE 4

The session control system, having received the above session description, processes the tree structure of the session description starting at base module 410. The first module encountered is base module 420. As this is not a media module but it does have sub-modules, the session control system continues down this branch to media module.

The media field of the media module 421 already defines the multimedia client application required as RealPlayerG2 (a multimedia application of Real Networks Inc) thus the session control system ignores it and continues to the next media module. The media field of the media module 422 does not have a multimedia client application defined, however a format for the audio data is specified. The session control system recognises that this particular audio format can be supported by RealPlayerG2 so it amends the media field to read client=RealPlayerG2. The next media module 423 has already defined a client application as wb so it ignores this module, and it also ignores the option module 424.

The session control system parses the tree structure again in order to launch client applications. The first media module 421 specifies that RealPlayerG2 should be launched, hence the session control system launches the application on the end user's system and keeps a record of this activity. The second media module 422 specifies an application that has already been launched and so the session control system ignores it and continues to the next media module. The media module 423 specifies that wb should be launched, so the session control system launches the application and keeps a record of this activity.

RealPlayerG2 is passed the media module 421, base module 420 and modules 422–424. The application processes the media modules given to determine which it can handle, and in this case it identifies 421 and 422. Having determined which streams it can handle, the application sends a connection request back to the session control system requesting connection to the media streams of modules 421 and 422. Similarly, wb is passed the media module 423, base module 420, modules 421–422, and the module 424. The application processes the given modules as described previously, and requests connection to the media stream of modules 423.

The above connection requests are assembled by the session control system into a list, this list is then passed to the communications manager along with the session QoS policy module 424. The communications manager determines whether each request is viable according to the steps of FIG. 7.

Assuming there are sufficient resources for all the connection requests for mandatory media streams, the communications manager passes back a list of viable streams to the session control system which then processes the tree again to determine the connection data held in the connection field of each media module so it can request that the communications manager initiate a connection to the appropriate media stream for each of the viable connection requests according to the connection data. The session control system then manages the session and its media stream connections as is described with reference to steps 670 to 700 of FIG. 6.

Due to the heterogeneity of the Internet and differing capabilities and operating environments of end user computer systems, the session control system described has been implemented in Java (Java is a Trade Mark of Sun Microsystems Inc.). The announcement receiving interface, Session Directory, receives the announcements and passes those selected by the end user to the session control manager implemented as an application programming interface running as a background process on the end user's computer.

Whilst exemplary embodiments have been described with reference to the Internet and multicast transmissions, it will be apparent to the reader that the described modular session description and the session control system are applicable to the announcement and subsequent management of connections to media streams of a (multi) media session using other known transport mechanisms such as unicast.

Furthermore, although mechanisms for encryption, charging and other such services have not been explicitly described, it would be apparent to the reader that appropriate session descriptions and associated functions within the session control system for their processing could be readily implemented according to the mechanism required.

What is claimed is:

1. A method of managing media stream connections for a media session, said method comprising:
   receiving a session description of a media session;
   parsing the session description to determine appropriate media application programs for processing at least one media stream of the session description, the session description including data relating to a quality of service policy;
   determining whether participation in the media session is viable using the data relating to a quality of service policy;
   selecting one or more media streams identified in the session description; and
   connecting the selected one or more media streams to one or more respective media application programs utilising a session control configured for managing media stream connections for the one or more media application programs;
   wherein the one or more media application programs select one or more of the media streams identified in the session description which are required and pass respective connection requests to the session control.

2. A method according to claim 1, in which the selection of the one or more media streams is carried out by the session control according to predetermined criteria.

3. A method according to claim 2, in which the predetermined criteria are specific to the preferences of at least one of the group consisting of an end-user, the terminal and the one or more media application programs.

4. A method of managing media stream connections for a media session, said method comprising:
   receiving a session description of a media session;
   parsing the session description to determine appropriate media application programs for processing at least one media stream of the session description, the session description including data relating to a quality of service policy;
   determining whether participation in the media session is viable using the data relating to a quality of service policy;
   selecting one or more media streams identified in the session description;
   connecting the selected one or more media streams to one or more respective media application programs utilising a session control configured for managing media stream connections for the one or more media application programs; and
   passing at least a portion of the session description to the one or more media application programs.

5. A method according to claim 4, in which the one or more media application programs generate or modify a quality of service policy for the connection requests for use by the session control.

6. A method according to claim 4, in which the one or more media application programs modify the session description for changing the subsequent management of connections by the session control.

7. A method according to claim 1, in which the session control passes the connection requests to a terminal communications manager which determines whether the connection requests are viable and subsequently initiates the connections.

8. A method according to claim 7, in which the session control prioritises the connection requests from the one or more media application programs according to the quality of service policy to create a set of connection requests which are passed to the communications manager.

9. A method according to claim 7, in which the communications manager determines resources required for each connection request and whether the requests can be met given available resources.

10. A method according to claim 9, in which if the connection requests can be met the connections are initiated.

11. A method according to claim 9, in which if a connection request cannot be met and the connection request is for an optional media stream of the media session then the communications manager proceeds by declaring the connection request unviable and moves to the next connection request.

12. A method according to claim 9, in which if a connection request cannot be met and the connection request is for a mandatory media stream of the media session then the communications manager proceeds by attempting to free resources to meet the connection request.

13. A method according to claim 12, in which if the communications manager is unable to free sufficient resources to meet the connection request, the connection request is declared unviable and the communications manager refuses to join the media session.

14. A method of managing media stream connections for a media session, said method comprising:
   receiving a session description of a media session;
   parsing the session description to determine appropriate media application programs for processing at least one media stream of the session description, the session description including data relating to a quality of service policy;
   determining whether participation in the media session is viable using the data relating to a quality of service policy;
   selecting one or more media streams identified in the session description;
   connecting the selected one or more media streams to one or more respective media application programs utilising a session control configured for managing media stream connections for the one or more media application programs; and
   obtaining a missing part of the session description by following one or more links in the session description before parsing the session description.

15. A system for managing media stream connections derived from a session description for a media session, the system comprising:
- a session control for parsing the session description to determine one or more appropriate media application programs for processing at least one media stream of the session description;
- a communications manager for determining based on available resources whether the participation in the media session is viable using a quality of service policy based on quality of service data provided in said session description; and
- the session control being configured for managing media stream connections for the one or more media application programs;
- wherein the media application programs are arranged to select one or more of the media streams identified in the session description which are required and pass a number of connection requests to the session control.

16. A system for managing media stream connections derived from a session description for a media session, the system comprising:
- a session control for parsing the session description to determine one or more appropriate media application programs for processing at least one media stream of the session description;
- a communications manager for determining based on available resources whether the participation in the media session is viable using a quality of service policy based on quality of service data provided in said session description; and
- the session control being configured for managing media stream connections for the one or more media application programs;
- in which the session control is arranged to pass at least a portion of the session description to the one or more media application programs.

17. A system according to claim 16, in which the media applications are arranged to generate or modify a quality of service policy for the connection requests for use by the session control.

18. A system according to claim 16, in which the one or more media application programs are arranged to modify the session-description for changing the subsequent management of connections by the session control.

19. A system according to claim 15, the communications manager being configured for initiating the connections.

20. A system according to claim 19, in which the communications manager is arranged to determine whether the connection requests are viable and subsequently initiate the connections.

21. A system for managing media stream connections derived from a session description for a media session, the system comprising:
- a session control for parsing the session description to determine one or more appropriate media application programs for processing at least one media stream of the session description;
- a communications manager for determining based on available resources whether the participation in the media session is viable using a quality of service policy based on quality of service data provided in said session description; and
- the session control being configured for managing media stream connections for the one or more media application programs;
- the communications manager being configured for initiating the connections;
- in which the session control system is adapted to prioritise the connection requests for the one or more media streams from one or more of the media application programs according to the quality of service policy to create a set of connection requests which are passed to the communications manager.

22. A system according to claim 19, in which the communications manager is arranged to determine resources required for each connection request in sequence and whether the connection requests can be met given available resources.

23. A system according to claim 22, in which the communications manager is arranged to initiate the connections if the connection requests can be met.

24. A system for managing media stream connections derived from a session description for a media session, the system comprising:
- a session control for parsing the session description to determine one or more appropriate media application programs for processing at least one media stream of the session description;
- a communications manager for determining based on available resources whether the participation in the media session is viable using a quality of service policy based on quality of service data provided in said session description; and
- the session control being configured for managing media stream connections for the one or more media application programs;
- the communications manager being configured for initiating the connections;
- in which the communications manager is arranged to determine resources required for each connection request in sequence and whether the connection requests can be met given available resources; and
- the communications manager is arranged to declare a connection request unviable and to move to the next connection request if the connection request cannot be met and it is for an optional media stream of the media session.

25. A system for managing media stream connections derived from a session description for a media session, the system comprising:
- a session control for parsing the session description to determine one or more appropriate media application programs for processing at least one media stream of the session description;
- a communications manager for determining based on available resources whether the participation in the media session is viable using a quality of service policy based on quality of service data provided in said session description; and
- the session control being configured for managing media stream connections for the one or more media application programs;
- the communications manager being configured for initiating the connections;
- in which the communications manager is arranged to determine resources required for each connection request in sequence and whether the connection requests can be met given available resources; and
- the communications manager is arranged to attempt to free resources to meet a connection request if the connection request cannot be met and it is for a mandatory media stream of the media session.

26. A system according to claim 25, in which the communications manager is arranged to declare a connection request unviable and thereby refuse to join the media session if it is unable to free sufficient resources to meet the connection request.

27. A system for managing media stream connections derived from a session description for a media session, the system comprising:
- a session control for parsing the session description to determine one or more appropriate media application programs for processing at least one media stream of the session description;
- a communications manager for determining based on available resources whether the participation in the media session is viable using a quality of service policy based on quality of service data provided in said session description; and
- the session control being configured for managing media stream connections for the one or more media application programs;
- an announcement interface which is arranged to detect missing modules in a received session description and subsequently obtain them using location identifying links provided in the session description.

28. A computer readable storage medium containing executable instructions for performing the method of claim 1.

29. A terminal comprising at least one memory containing executable instructions for performing the method of claim 1.

* * * * *